March 25, 1958 A. D. PINOTTI 2,827,737
APPARATUS FOR MOLDING AND RESHAPING GLASS PARTS
Filed April 19, 1955 3 Sheets-Sheet 1

INVENTOR
ALFRED D. PINOTTI
BY
ATTYS

March 25, 1958  A. D. PINOTTI  2,827,737
APPARATUS FOR MOLDING AND RESHAPING GLASS PARTS
Filed April 19, 1955  3 Sheets-Sheet 2

INVENTOR
ALFRED D. PINOTTI
BY
Rule & Hoge
ATTY'S

March 25, 1958     A. D. PINOTTI     2,827,737
APPARATUS FOR MOLDING AND RESHAPING GLASS PARTS
Filed April 19, 1955     3 Sheets-Sheet 3

INVENTOR
ALFRED D. PINOTTI
BY
Rule and Hoge,
ATTY'S

United States Patent Office 2,827,737
Patented Mar. 25, 1958

2,827,737

APPARATUS FOR MOLDING AND RESHAPING GLASS PARTS

Alfred D. Pinotti, Toledo, Ohio, assignor to Owens-Illinois Glass Company, a corporation of Ohio Application April 19, 1955, Serial No. 502,411

3 Claims. (Cl. 49—37)

My invention relates to apparatus by which a glass article or part is molded, as by press molding, and thereafter, while the glass is still hot and in a plastic condition, the molded part is subjected to a subsequent press molding operation to correct any irregularities in the molded surface.

The invention is of utility in the art of molding and shaping the face plates of picture tubes such as used in television. Such face plates, particularly those used in color television, must have their curved faces shaped with great accuracy. With the usual methods and apparatus for press molding such face plates, they are subject to greater or less distortion or inaccuracy from various causes. To overcome this difficulty the usual method has been to grind the face plates by generating curves and thereafter polish the ground surfaces. This operation is open to various objections and is entirely impractical for reshaping the generally rectangular or non-circular face plates commonly used in picture tubes.

One of the causes of distortion when a face plate is molded in accordance with present day methods is due to the fact that the molded article when withdrawn from the mold is more or less distorted because the glass is still at a high temperature, such that the viscosity is too low to permit the article to retain its exact molded form. In other words, there is more or less flowing of the glass before it fully sets and hardens. This difficulty is particularly pronounced where there are variations in the thickness of the article at different points. One cause of distortion is due to the tendency of the press plunger when withdrawn from the mold to create a vacuum which tends to lift the glass off the bottom of the mold. A further source of distortion is due to the tendency of the glass to stick to the plunger as the latter is withdrawn, which has substantially the same effect as that due to suction.

A primary object of the present invention is to provide an apparatus by which the above noted difficulties are overcome. For this purpose there is provided in combination with the usual press plunger of the molding machine, a secondary or reshaping plunger which may have a molding surface of the same shape and curvature as that of the primary press plunger. This secondary plunger is projected into the mold immediately or shortly after the primary plunger has been withdrawn and serves to reshape the glass which has been previously pressed by the main press plunger, thereby correcting any irregularity or deviation from the desired design so that the molded surface of the article conforms exactly to that of the mold. The reshaping plunger operates to eliminate any irregularities due to flowing of the glass, caused by suction or sticking of the glass as the press plunger is withdrawn, or from any other cause, and thereby restores the glass to its desired shape. The reshaping plunger operates when the glass has cooled down to a level at which the viscosity of the glass is high enough to prevent further flow or distortion of the glass. The invention further provides means for electrically heating the reshaping plunger to any desired temperature and for thermostatically controlling the temperature and maintaining it within a fixed temperature range to prevent checking or undue chilling of the glass.

Referring to the accompanying drawings which illustrate a press molding and reshaping machine for use in practicing my invention:

Figure 1:
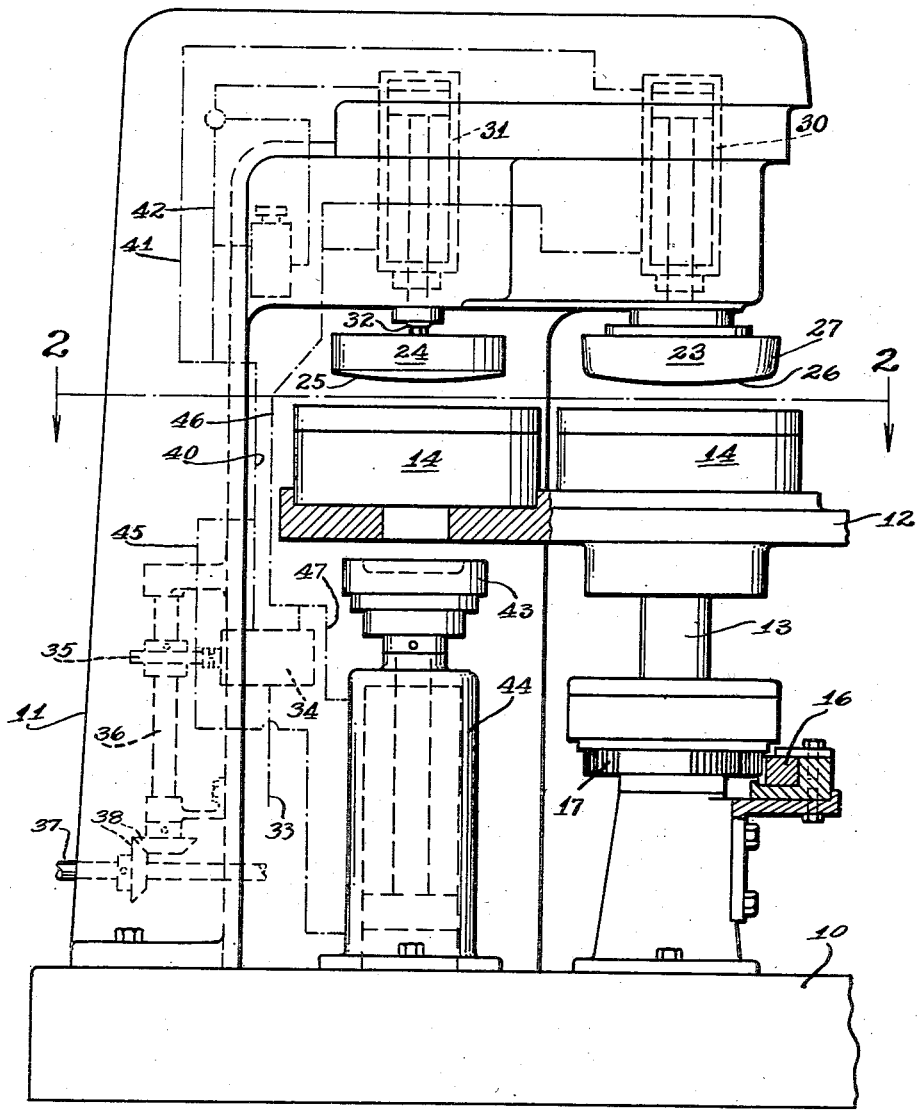
Fig. 1 is a part sectional elevational view of the machine at the line 1—1 on Fig. 2, parts being broken away, and other parts shown diagrammatically.
Figure 2:
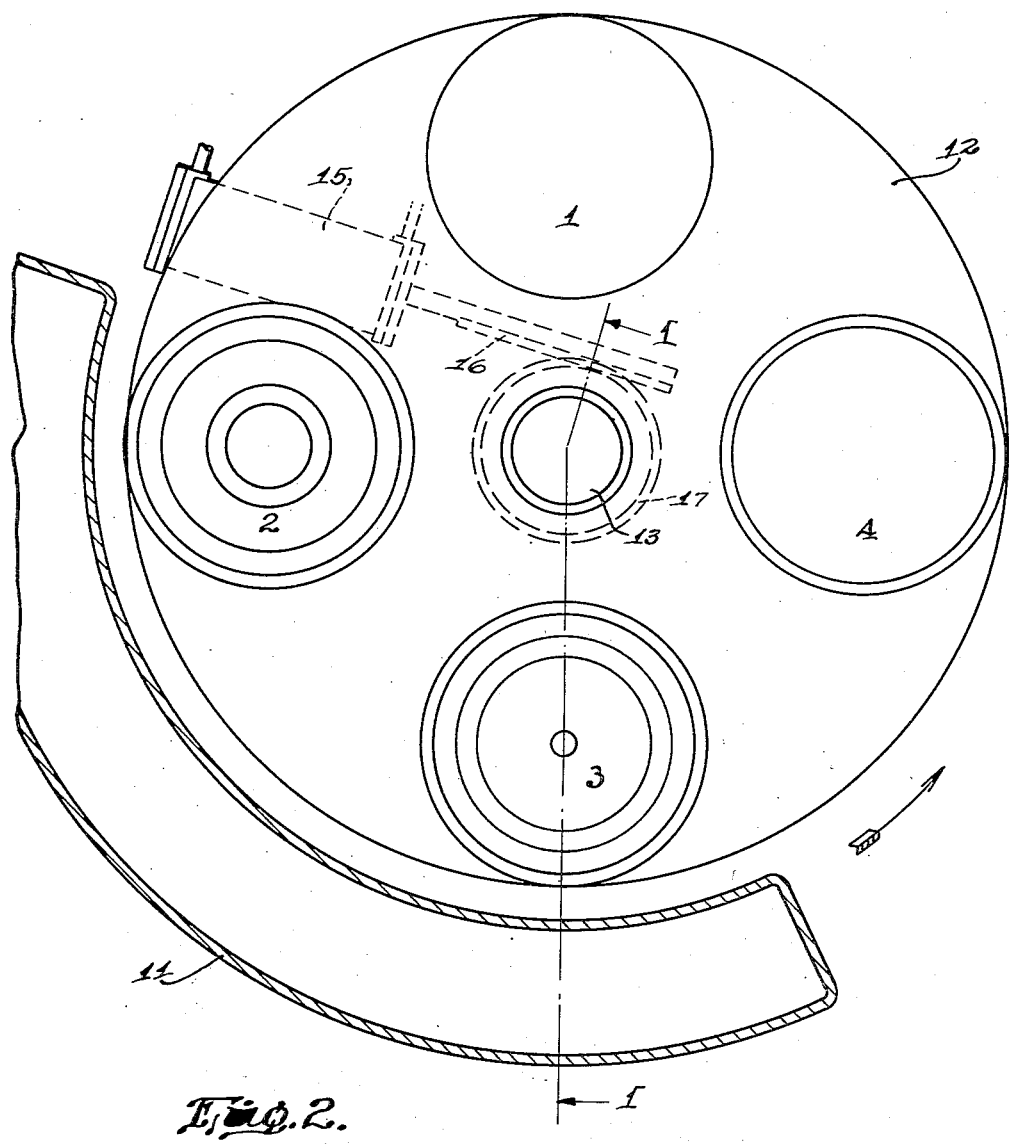
Fig. 2 is a partly diagrammatic sectional plan view at the line 2—2 on Fig. 1.

As shown in Fig. 1, the machine frame, including a standard 11, is mounted on a base 10. A mold carriage comprising a circular table 12 is keyed to a vertical shaft 13 and is rotated intermittently step by step about the axis of the shaft 13. Molds 14 are mounted on the table 12 at a loading station 1 and are brought by the rotation of the carriage to a press molding station 2, a repressing station 3 and a take-out station 4. The carriage is rotated in a conventional manner by an air-operated piston motor 15 (Fig. 2). A rack 16 attached to the motor piston rod runs in mesh with a pinion 17 having a one-way driving connection with the shaft 13.

Figure 3:
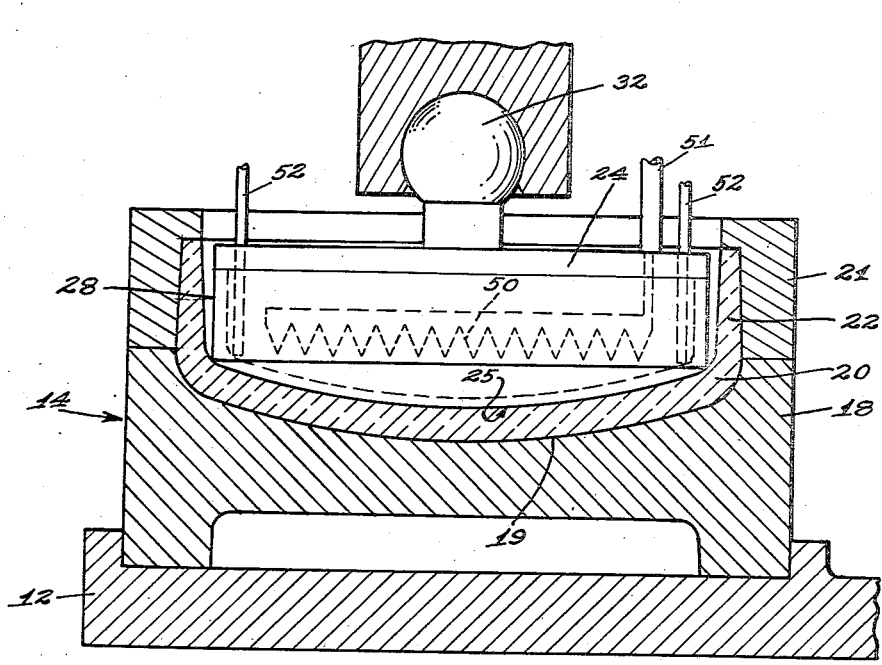
Fig. 3 is a cross-sectional elevation of a mold and reshaping press plunger.

As shown in Figs. 1 and 3, each of the molds 14 comprises a body mold section 18 formed with a mold cavity having a curved concave molding surface 19 which molds the exterior convex surface of the face plate 20. The mold includes an upper ring section 21 for molding the exterior surface of the flange portion 22 of the face plate. A charge of molten glass is placed within the mold 18 and a press plunger 23 (Fig. 1) is then lowered and molds the glass to the desired form in a conventional manner. The press plunger 23 is formed with a convex molding surface 26, for molding the concave inner surface of the body of the face plate 20, and an upwardly and outwardly flared marginal wall surface 27 for molding the flared surface of the face plate. After the face plate is thus molded, the plunger 23 is withdrawn upwardly. The carriage is then indexed by the motor 15 to bring the mold 14 to the next succeeding station, herein referred to as the reshaping station, at which a repressing and reshaping plunger 24 is mounted. The bottom surface 25 of the plunger 24 may be of precisely the same shape or contour as the bottom molding surface 26 of the press plunger 23. The side walls of the press plunger 23 are upwardly flared to impart a correspondingly tapered form to the inner surface of the marginal portion 22 of the face plate, as is shown in Fig. 3. The side wall surface 28 of the reshaping plunger 24 (Fig. 3) is vertical or of somewhat lesser diameter than the plunger wall 27. This provides a space between the surface 28 of the plunger and the molded glass and thereby serves to prevent the formation of a vacuum or suction when the reshaping plunger 24 is withdrawn, thus preventing any possible distortion of the repressed surface of the face plate when the repressing plunger 24 is withdrawn.

Air-operated piston motors 30 and 31 (Fig. 1) are operatively connected respectively to the plungers 23 and 24 for lowering and lifting the plungers. The piston rod of the motor 31 is connected by a ball and socket joint 32 to the plunger 24.

Air under pressure for operating the motors is supplied through a pressure line indicated diagrammatically at 33 (Fig. 1). This line extends to a control valve 34 which is actuated by a cam 35 keyed to a shaft 36. A continuously rotating drive shaft 37 has a driving connection with the shaft 36 through intermeshing bevel gears 38. Air pressure for lowering the plungers 23 and 24 is supplied through the valve 34, an air pressure line 40 and branch lines 41 and 41 extending to the upper ends of the cylinders 30 and 31. When the motor 31 operates to lower the reshaping plunger a bottom supporting plate 43 is simultaneously lifted by an air cylinder 44 into contact with the bottom surface of the mold table 12. The air pressure for lifting the plate 43 is supplied from the pressure line 40 through a branch line 45 leading to the lower end of the cylinder 44. When the valve 34 is reversed by its cam 35, the pressure line 40 is cut off and connected to the exhaust. At the same time a line 46 is opened to the pressure line 33, thereby supplying pressure to the lower ends of the cylinders 30 and 31 for lifting the plungers 23 and 24. The air pressure is also supplied at this time through a line 47 for lowering the plate 43.

Electric heating elements 50 are mounted within the reshaping plunger 24, said elements being connected to any suitable source of electric current supplied through a conduit 51. The current supply and temperature are under the control of thermostatic control devices 52 by which the temperature is automatically maintained at any desired degree. Such heating means provides for maintaining the plunger at a sufficiently high temperature to prevent undue chilling and checking of the glass.

Figures 4, 5:
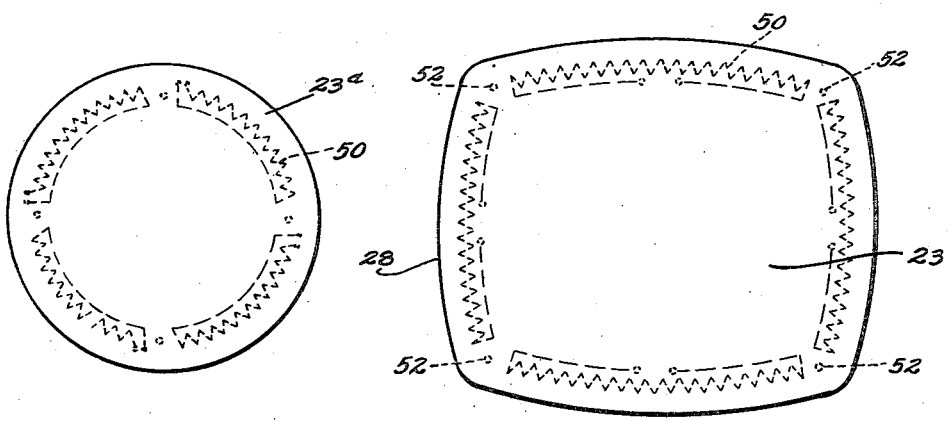
Fig. 4 is a plan view of a molding plunger of approximately rectangular form.
Fig. 5 is a view similar to Fig. 4 showing a circular plunger.

The mold plungers and the mold cavities are of a shape to give the face plate 25 an approximately rectangular formation (Fig. 4). In the modified form shown in Fig. 5, the plunger 23ª is circular in outline for molding a circular face plate.

Modification may be resorted to within the spirit and scope of my invention.

I claim:
1. A machine for molding a face plate of a picture tube, the said face plate comprising a body having a convex exterior surface and a concave inner surface and a marginal flange extending approximately perpendicular to said body with its inner surface outwardly flared from said body, said machine comprising a mold carriage, a mold thereon, means for driving the carriage and thereby bringing the mold to a plurality of stations in succession including a pressing station and a repressing station, said mold formed with a mold cavity conforming to said shape of the face plate, a press plunger at the pressing station movable to and from a molding position within the mold for press molding a charge of glass and thereby forming the face plate, said plunger having a convex molding surface for molding the said concave inner surface of the face plate and an upwardly and outwardly flared marginal wall surface for molding said flared surface of the face plate, a repressing plunger at said repressing station, the repressing plunger having a molding surface of the same shape and contour as the said convex molding surface of the first mentioned plunger, and means for operating said repressing plunger and repressing the face plate within the mold, said repressing plunger having a marginal wall of lesser diameter than said flared wall surface of the press plunger, whereby there is provided a space between the said marginal wall of the repressing plunger and the opposite molded surface of the flange portion of the face plate, thereby preventing suction between the repressing plunger and the molded face plate when the repressing plunger is withdrawn.

2. The machine defined in claim 1, the reshaping plunger having mounted therein an electric heating element.

3. A machine for molding a face plate, said face plate comprising a body and an integral marginal flange portion, said machine comprising a mold formed with a mold cavity conforming to the shape of the face plate, a press plunger and a repressing plunger each mounted for up- and-down movement, means for relatively moving the mold and plungers in a lateral direction by which the mold is first brought into alignment with the said press plunger and thereafter aligned with the repressing plunger, means for moving the press plunger downward into the mold cavity and thereby molding a charge of molten glass in said cavity to form the face plate, the press plunger having a bottom molding surface shaped to mold the inner surface of the body of said face plate and a marginal molding surface shaped to mold the inner surface of the said flange portion, means for operating the repressing plunger when brought into alignment with the mold, the repressing plunger having a bottom molding surface of the same shape as said bottom surface of the press plunger for reshaping the said inner surface of the body of the face plate, the repressing plunger having a marginal wall surface of a shape to provide a space between said wall surface and the molded inner surface of the said flange portion of the face plate, permitting the passage of air when the reshaping plunger is operated and thereby preventing suction between the repressing plunger and the molded face plate when the repressing plunger is withdrawn.

References Cited in the file of this patent

UNITED STATES PATENTS

| | | |
|---|---|---|
| 588,173 | Pitt | Aug. 17, 1897 |
| 1,134,200 | Heupel | Apr. 6, 1915 |
| 1,343,987 | Stewart | June 22, 1920 |
| 1,640,442 | De Jong | Aug. 30, 1927 |
| 2,410,616 | Webb | Nov. 5, 1946 |
| 2,419,763 | Cassell | Apr. 29, 1947 |
| 2,419,764 | Cassell | Apr. 29, 1947 |